Figure 1:
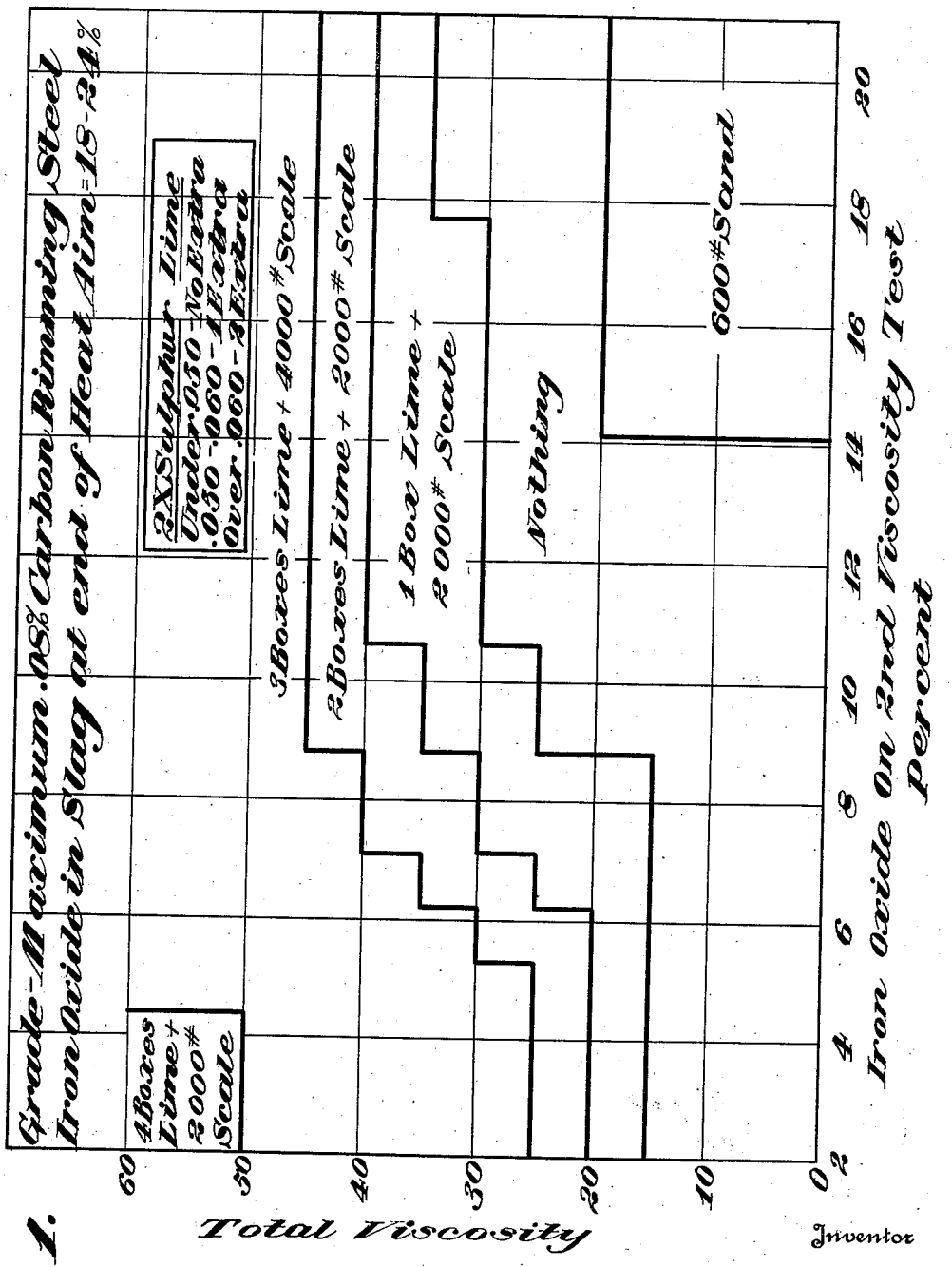

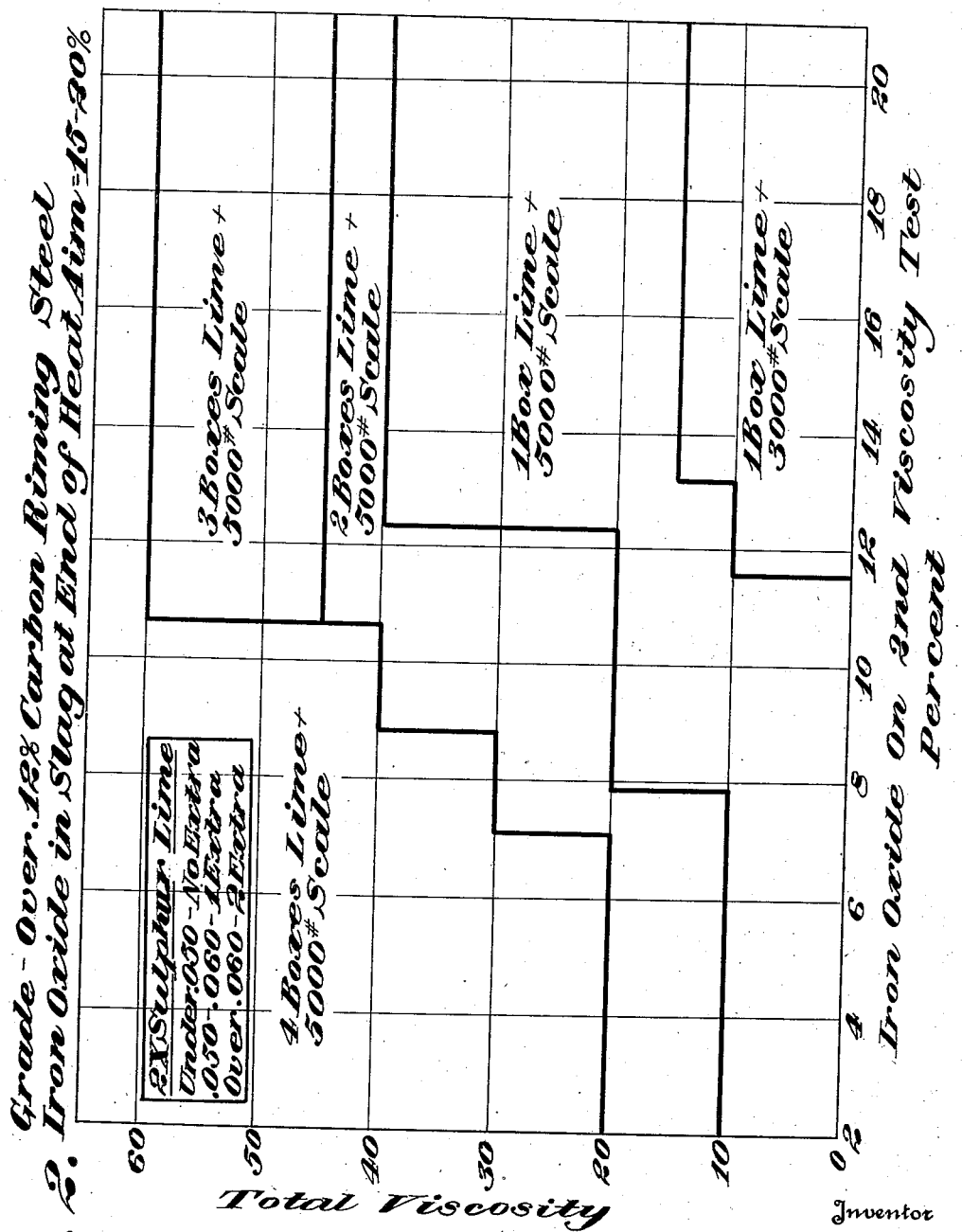

Jan. 14, 1941.  C. H. HERTY, JR  2,228,566
SLAG CONTROL
Filed March 15, 1939  4 Sheets-Sheet 3
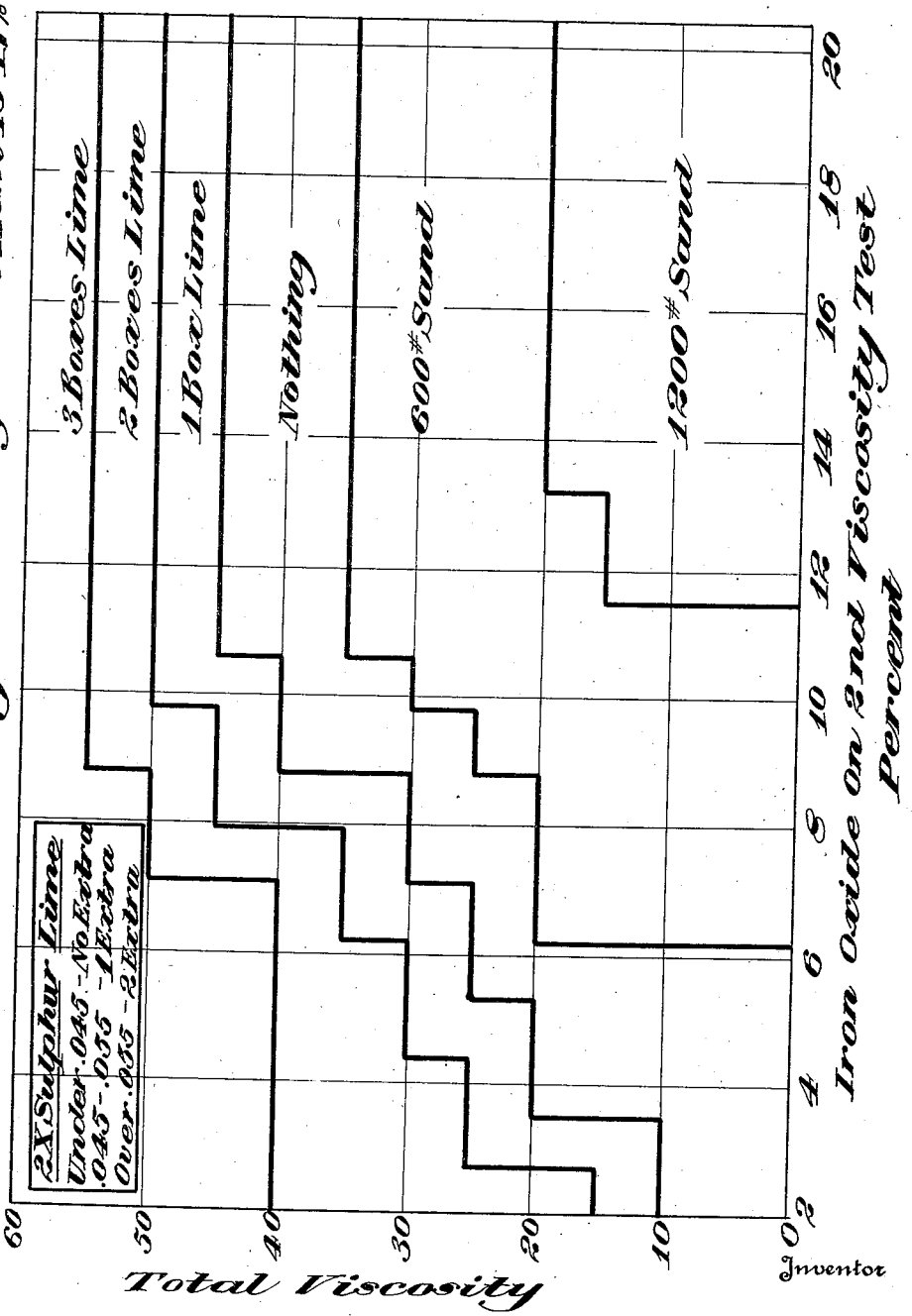

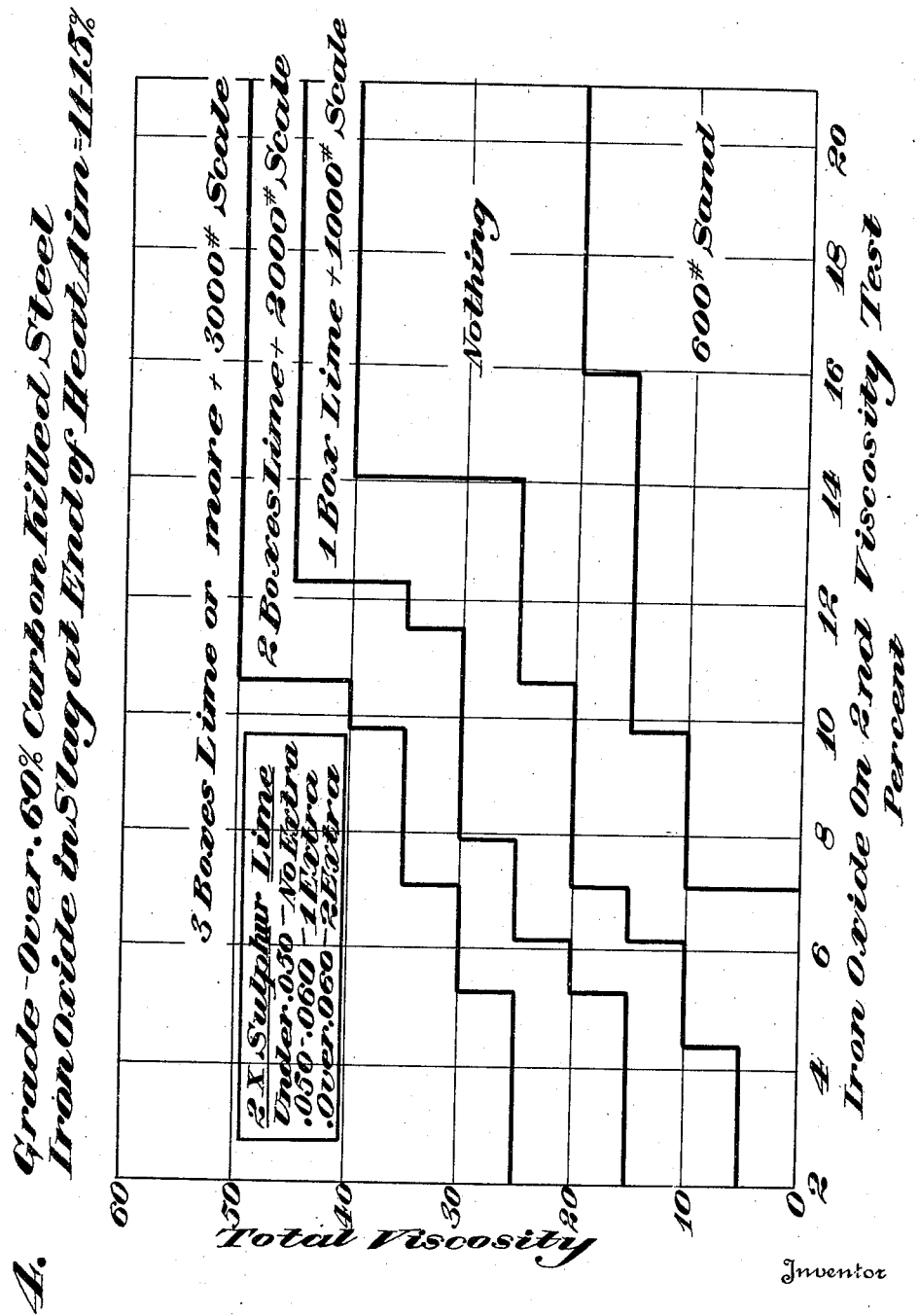

Patented Jan. 14, 1941

2,228,566

UNITED STATES PATENT OFFICE 2,228,566

SLAG CONTROL

Charles H. Herty, Jr., Bethlehem, Pa., assignor to Bethlehem Steel Company, a corporation of Pennsylvania Application March 15, 1939, Serial No. 261,871

11 Claims. (Cl. 75—54)

This invention relates to a method of slag control of basic open-hearth steel heats wherein tests are made of the slag to determine the iron oxide content and the probable rate of increase or change of iron oxide in the slag during the course of the heat. According to the indications of these tests a previously set schedule of additions of lime, roll scale, or silica is followed, designed to obtain a certain range of iron oxide content of the slag at the end of the heat, this range varying as desired for different grades of steel. The foundation of this method of slag control is the theory that the basicity of the slag, or in simplest terms, the ratio of lime to silica, determines in large measure the iron oxide content of the slag at the end of the heat.

I am aware that slag control methods depending on the said theory have already been practiced. However, there are two important novel features about this invention: (a) In the former methods the slag test samples were taken after the charge was completely melted, in particular after the last component of the charge to dissolve completely, namely the limestone, was dissolved. In the method of this invention the taking of slag samples begins long before the charge, or "heat," is melted—indeed soon after the calcination of the limestone, as evidenced by the lime boil, has begun, at which time only part of the scrap has melted and the hot metal or molten pig iron addition has been in the furnace only a relatively short time. Sampling is continued at intervals until the heat is melted as indicated by the cessation of the lime boil or by the absence of unmelted material when testing with a rod. The schedule of additions is based on the results of the last several samples. (b) In the former methods the slag samples were analyzed for lime and silica content. In the method of this invention only the iron oxide in the slag is chemically determined, and this not on the last sample taken at the moment when the heat is melted, but on the next to the last sample taken about ½ hour earlier. Instead of chemically analyzing for the lime and silica content to arrive at the basicity, the viscosity of the slag is determined by a simple and rapid viscosity test as described below. The relation between basicity and viscosity is such that in practice, viscosity tests have been found to serve for the purpose of slag control as well as or better than chemical analyses for lime and silica. The schedule of additions for each grade of steel is indicated on a graph in which the viscosity of the slag is plotted against the iron oxide content.

The chief advantage of these novel procedures is that considerably more time is available for making the indicated additions, for dissolving the additions in the slag, and for allowing the changed components of the slag to exercise their effect in attaining the desired iron oxide content of the slag at the end of the heat, or removing sulphur or phosphorus as the case may be. In the former methods of slag control in which slag samples were taken only after the charge had completely melted, and frequently after the subsequent ore addition, very little time was left after completion of the slag analysis, the making of the additions, and the fluxing of the additions, for the slag control to prove effective. For example, if the charge was completely melted about 2 hours before the heat was tapped and a slag sample was taken after complete melting, about 35 minutes would be consumed for the analyses of the lime and silica content of the sample, about 10 minutes to make the additions, and about 15 to 30 minutes in dissolving the additions leaving less than an hour before tapping for the modified slag to attain the desired compositions. In the method of this invention this time interval before tapping would be increased to at least 1½ hours, since the 35 minutes consumed in making the lime and silica analyses would be saved, the viscosity determination requiring only a minute or so. If, as is frequently the case in the generally practiced methods of slag control, the slag samples were taken after the ore addition usually made after the heat had completely melted, the time difference between the former methods and the method of this invention would be even greater. The matter of time is extremely important and largely explains why many melters have disapproved of a rigid slag control procedure and particularly of sand additions. The fact is that these additions were frequently not made in time to be effective and tended to do harm by inserting a variable whose action was uncertain. Making lime additions to the slag earlier in the heat is particularly important where this is added for sulphur removal, because the earlier a basic slag is obtained, the more complete the removal of sulphur.

Sampling of the slag soon after the hot metal addition for the purposes of slag control was undertaken because it was found that the silicon in the pig iron is so rapidly oxidized that practically all of the silica is in the slag by this time, a fairly constant proportion of the lime is also dissolved, and a fairly representative amount of iron oxide for the particular heat at that stage, is present in the slag.

The method of slag control of this invention will now be described. The limestone burden in the charge is regulated on the principle of obtaining the proper basicity to give the desired iron oxide content of the slag at the end of the heat for the particular grade of steel being made. A higher basicity will give a higher iron oxide content. In general for low carbon rimming steel a high iron oxide content, as high as about 25 per cent, is required to give a high enough iron oxide content of the bath for good rimming action. For high carbon steel a lower iron oxide content is desired to give a less oxidized heat; the iron oxide content may be as low as about 12 per cent, although at this low iron oxide content (and low basicity) phosphorus tends to revert from the slag to the bath and the basicity and hence the iron oxide content of the slag may need to be raised on this account. Similarly where the specification calls for a particularly low sulphur content, for example, a maximum of 0.030 per cent sulphur, lime additions may need to be made after early sulphur analyses indicate that the sulphur might finish higher than that. Slag control must be practiced during the course of the heat and can not be left entirely to proper burdening of the charge because of the uncertainty of the composition of the scrap and hot metal addition, particularly in silicon content. However, by proper burdening of the charge a good many heats can be worked without making any additions during the heat for the purposes of slag control. By reducing the lime in the burden to a practicable minimum it is possible to save appreciably on the time for each heat and at the same time improve the quality of the steel.

After the hot metal addition has been made a slag test for viscosity is taken as soon as lumps of lime, having come up from the bottom, begin to show in the slag. This is usually about ½ hour after the lime boil begins. Sampling is continued at about ½ hour intervals until the charge is melted. The last three tests are used for calculating the total viscosity, by giving the viscosity value for the last test a weight of 3, for the next to the last test a weight of 2, and for the third from the last a weight of 1, for example as follows:

|  | Viscosity value inches | Weight |
| --- | --- | --- |
| Last test | 3 | X3  9 |
| Next to last | 4 | X2  8 |
| Third from last | 5 | X1  5 |
| Total viscosity |  | 22 |

For determining the slag viscosity a viscosimeter is used which consists of a rectangular steel block having a well at one end with a ¼″ hole extending from the well in a perpendicular direction to it to the end of the block a distance of 12″. The viscosimeter is held so that the well is in a vertical position and the 12″ long hole in a horizontal position. A sample of slag from the furnace is then poured as quickly as possible into the well. The slag flows from the well into the ¼″ hole and the distance which it flows and fills the hole is taken as an inverse measure of the viscosity. A heavy or viscous slag will flow a maximum of 2″ along the hole before solidifying, a creamy more fluid slag 2″ to 4″, and a thin slag 4″ to 12″.

At about the time of the second viscosity test a slag and a metal sample are taken from the furnace and sent to the laboratory for analyses of iron oxide in the slag and sulphur in the bath. If the indications are that the complete melting of the heat will be unduly delayed, a later slag and metal test is also taken and analyzed, the values of the later analyses being used for the purposes of slag control. In general, the samples which are analyzed for iron oxide in the slag and sulphur in the metal correspond, in the history of the heat, to the next to the last viscosity test used in calculating the total viscosity. These samples are referred to as 2X tests. Since these analyses can be made in about 20 minutes, the results are already available at the moment the heat is melted, so that there is no delay thereafter in making the prescribed additions.

As has been stated, the schedule of additions for each grade of steel is indicated on a graph on which the iron oxide content of the slag, obtained as indicated, is plotted against the total viscosity. The schedule of additions is based on the principles related above, adjusted for the different grades of steel after extensive observation and testing in several open-hearth plants. Four such specimen schedules are shown in Figs. 1, 2, 3, and 4. It should be understood that these are merely representative and that any number of other variations may be used corresponding to the results desired on various grades of the same or other steel.

As shown in Fig. 1, for a low carbon rimming steel, various areas representing different ranges of total viscosity and iron oxide are delineated, a different addition being indicated for each area. The advantage of basing the additions on the iron oxide content as well as the viscosity (corresponding to the basicity) instead of on the viscosity alone will be clear from the graph. Thus at a total viscosity of 25, 2 boxes of lime +2000# of scale are added when the iron oxide content of the slag, total iron calculated to FeO, is 6%, whereas for the same total viscosity, but an iron oxide content of 10%, no addition is made. In the first case the normal rate of increase of the iron oxide content in the course of the heat must be accelerated so that it will end within the desired range, whereas in the second case the normal rate of increase will itself result in the attainment of the range aimed at by the time the heat is tapped. Thus this method of control takes into account the iron oxide content of the slag at the time of sampling as well as its probable rate of change during the progress of the heat as a function of the basicity and the scheduled additions. It may be explained that in the first case the accelerating effect of the 2 boxes of lime on the rate of increase of iron oxide would not be sufficient to cause the slag to finish with the desired iron oxide content in the time remaining before tapping. For this reason the 2000 lbs. of roll scale are added as well, which serve to further increase the rate of increase in iron oxide.

As shown in the upper right-hand corner of Fig. 1 extra lime additions are prescribed to aid sulphur elimination so that the sulphur content of the finished steel will come within the specification limits. These lime additions are based on the 2X sulphur test, that is on the sulphur analysis of the metal sample taken at about the time of the next to the last viscosity test. As indicated, if the sulphur analysis is under 0.050% no extra lime is added to the addition indicated in the delineated areas, if it is 0.050 to 0.060% 1 extra box of lime is added, and if it is over 0.060% 2 extra boxes of lime are added.

Figs. 2, 3, and 4 show similar graphs for higher carbon rimming steel and for higher carbon killed steel. The desired iron oxide content at the end of the heat decreases for the higher carbon content steels. Too low an iron oxide content is not desired because this would result in a tendency for reversion of phosphorus from the slag to the molten metal. No sand additions are indicated in Fig. 2 because for this grade of higher carbon rimming steel a fairly high iron oxide content is desired to promote good rimming action. With the higher carbon content rimming steel the tendency is for the slag to finish lower than desired in iron oxide, so that lime and roll scale additions are prescribed even when the total viscosity is low and the iron oxide is high at the time of sampling. In Fig. 1 on the other hand, for the lower carbon rimming steels the tendency is for the slags to finish higher than desired in iron oxide, so that when the slag has a low total viscosity and a high iron oxide at the time of sampling, a sand addition is prescribed. Similarly for the killed steels larger sand additions are called for in Fig. 3 for the lower carbon steel in which the slag tends to finish higher than desired in iron oxide than in Fig. 4 for the higher carbon steel in which the slag does not tend to finish so high in iron oxide.

A box of burnt lime weighs about 1500 lbs. If limestone is used a box designates about 2000 lbs. Some other material high in lime may be used in which case a box would designate excess base equivalent to about 1500 lbs. of burnt lime. By sand is meant silica sand, silica brick, or gravel—or any siliceous material such as acid open-hearth slag may be used in which case an equivalent amount of excess silica should be added. Instead of roll scale, iron ore or other form of iron oxide may be used, preferably fine, so that it will be incorporated in the slag and not sink to the bath. If the iron ore contains an appreciable amount of silica a compensating addition of lime may be made. When the total viscosity and iron oxide content of the slag fall very close or onto the boundary of one of the delineated areas in the graph, the melter may use his judgment in making an addition corresponding to one of the areas or to the average of the additions for the areas on both sides of the boundary.

The chief stimulus to the practice of slag control is the assumption that when the slag is low in iron oxide the bath beneath the slag tends to be lower in iron oxide and vice versa. In general in higher carbon steel, as low an iron oxide content of the slag as will not cause a phosphorus reversion is sought, in order to get a bath lower in iron oxide and hence cleaner finished steel. However, for certain grades of steel it is not certain that the lowest iron oxide content of the slag will give the cleanest steel and for these a higher iron oxide content may be prescribed. The virtue of the slag control method of this invention is that whatever iron oxide content of the slag at the end of the heat is prescribed as a result of long observation and testing, this iron oxide content can be obtained in a very narrow range of variation and with great uniformity from heat to heat over an extended campaign. This greater uniformity of the iron oxide content of the slag is one of the chief advantages of the slag control method of this invention. The following table indicates the improved uniformity of iron oxide content obtained by the method of this invention as against the former method of slag control. The analyses are for the slags of different heats made consecutively in the same furnace.

*Per cent iron oxide content of slag at end of heats*

| Former method of slag control | Slag control method of this invention |
|---|---|
| 17.3 | 13.1 |
| 13.6 | 12.8 |
| 14.3 | 13.3 |
| 19.5 | 13.5 |
| 19.1 | 13.8 |
| 16.2 | 14.3 |
| 21.2 | 15.3 |

This improved uniformity is of particular value in grain size control where it is important to obtain the desired grain size with the minimum aluminum additions to avoid excessive amounts of large aluminum oxide inclusions in the steel. The other advantages attainable by proper slag control such as shorter time of heat, better manganese efficiency, lower consumption of fluxes and deoxidizers, avoidance of ladle reactions, lower chipping costs, better etch tests, cleaner steel, etc., can also be obtained more uniformly and in greater measure by the slag control method of this invention than by former methods.

Having thus described my invention what I claim and desire to secure by Letters Patent is:

1. In the basic open-hearth steel process the method of controlling the iron oxide content of the slag comprising the steps of taking samples of the slag from the furnace before the charge has completely melted, determining the iron oxide content and viscosity, and using the indications of these tests in making lime, iron oxide, or silica additions to the slag in order to affect the basicity and iron oxide content of the slag so as to produce a desired range of iron oxide content of the slag toward the end of the heat.

2. In the basic open-hearth steel process the method of controlling the iron oxide content of the slag comprising the steps of taking samples of the slag from the furnace before the charge has completely melted, determining the iron oxide content and viscosity, and using the indications of these tests in making lime, iron oxide, or silica additions to the slag according to a previously prepared schedule in order to affect the basicity and iron oxide content of the slag so as to produce a desired range of iron oxide content of the slag toward the end of the heat.

3. In a basic open-hearth steel process the method of controlling the iron oxide content of the slag comprising the steps of taking samples of the slag from the furnace before the charge has completely melted, determining the iron oxide content and viscosity, and using the indications of these tests in making lime, iron oxide, or silica additions to the slag according to a previously prepared schedule for that grade of steel in order to affect the basicity and iron oxide content of the slag so as to produce a desired range of iron oxide content of the slag toward the end of the heat.

4. In the basic open-hearth steel process the method of controlling the iron oxide content of the slag comprising the steps of taking samples of the slag from the furnace before the charge has completely melted, determining the iron oxide content and viscosity, and using the indications of these tests in making lime, iron oxide, or silica additions to the slag according to a previously prepared schedule for that grade of steel giving the required additions for varying viscosities and iron oxide contents of the samples, in order to affect the basicity and iron oxide content of the slag so as to produce a desired range of iron oxide content of the slag toward the end of the heat.

5. In the basic open-hearth steel process the method of controlling the iron oxide content of the slag comprising the steps of taking samples of the slag from the furnace before the charge has completely melted, testing the samples to determine the iron oxide content and basicity of the slag, and using the indications of these tests in making lime, iron oxide, or silica additions to the slag in order to affect the basicity and iron oxide content of the slag so as to produce a desired range of iron oxide content of the slag toward the end of the heat and to get the desired elimination of sulphur and phosphorus.

6. In the basic open-hearth steel process the method of controlling the iron oxide content of the slag comprising the steps of taking samples of the slag from the furnace before the charge has completely melted, determining the iron oxide content and viscosity, and using the indications of these tests in making lime, iron oxide, or silica additions to the slag according to a previously prepared schedule for that grade of steel as indicated on a graph in which the viscosity is plotted against the iron oxide content and giving the required additions for varying viscosities and iron oxide contents of the samples, in order to affect the basicity and iron oxide content of the slag so as to produce a desired range of iron oxide content of the slag toward the end of the heat and to get the desired sulphur and phosphorus elimination.

7. In the basic open-hearth steel process the method of controlling the iron oxide content of the slag comprising the steps of taking samples of the slag from the furnace before the charge has completely melted, at about ½ hour intervals beginning shortly after the hot metal addition until the heat is melted, determining the iron oxide content of a sample or samples before the last and the viscosity of the rest, and using the indications of these tests in making lime, iron oxide, or silica additions to the slag according to a previously prepared schedule for that grade of steel as indicated on a graph in which the sum of the viscosities weighted progressively greater in the order of taking the samples of about the last three samples are plotted against the iron oxide content of approximately the next to the last sample, and giving the required additions for varying viscosities and iron oxide contents of the samples, in order to affect the basicity and iron oxide content of the slag so as to produce a desired range of iron oxide content of the slag toward the end of the heat and to get the desired sulphur and phosphorus elimination.

8. In the basic open-hearth steel process, the steps of sampling the slag before the charge has completely melted, determining the iron oxide content and basicity of the slag, and adding silica to the slag when the determinations indicate that the basicity is above a predetermined amount.

9. In the basic open-hearth steel process, the steps of sampling the slag before the charge has completely melted, determining the iron oxide content and basicity of the slag, and adding lime to the slag when the determinations indicate that the basicity is below a predetermined amount.

10. In the basic open-hearth steel process, the steps of sampling the slag before the charge has completely melted, determining the iron oxide content and viscosity of the slag, and adding lime to the slag when the determinations indicate that the basicity is below a predetermined amount.

11. In the basic open-hearth steel process, the steps of sampling the slag before the charge has completely melted, determining the iron oxide content and viscosity of the slag, and controlling the basicity and iron oxide content of the slag on the basis of such determinations to obtain a desired iron oxide content of the slag toward the end of the heat.

CHARLES H. HERTY, JR.